July 5, 1938.  S. W. BORDEN  2,122,546
GROUND ROD FITTING
Filed Nov. 2, 1936
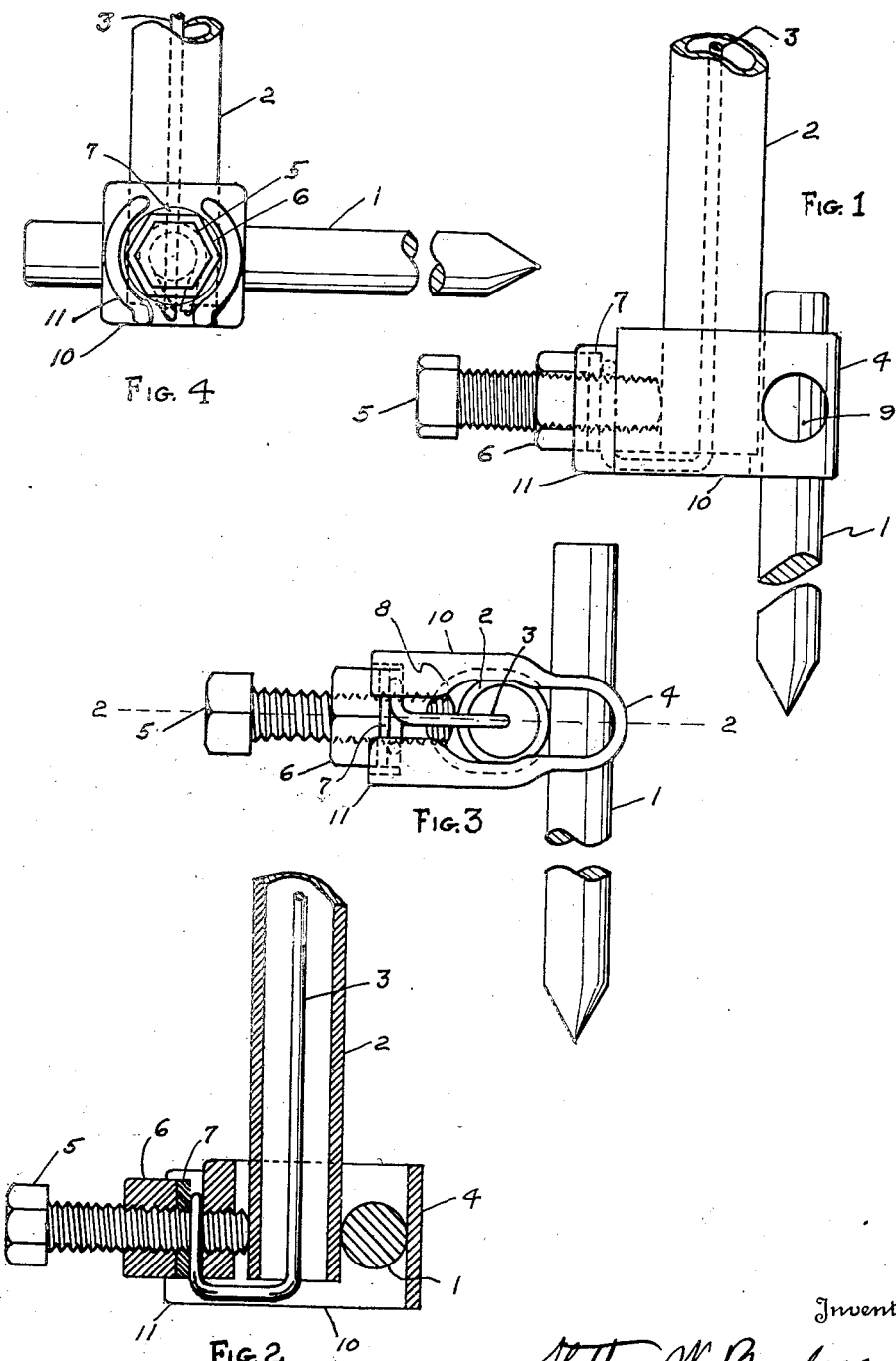
Inventor
Steffen W. Borden
By
Attorney Patented July 5, 1938

2,122,546

UNITED STATES PATENT OFFICE 2,122,546

GROUND ROD FITTING

Stephen W. Borden, Summit, N. J.

Application November 2, 1936, Serial No. 108,814

5 Claims. (Cl. 247—1)

The present invention has for its object to produce a very simple and inexpensive device adapted to form a secure, electrically-conductive connection between a ground rod and an electrical conduit and a conductor housed in the conduit and without the necessity of threading the conduit.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Fig. 1 is a front elevation of a device embodying the present invention in which a ground rod and a conduit are clamped and to which the conductor is secured. Fig. 2 is a cross section on the center line of the bolt 5 of Fig. 1 except that the bolt and conductor are not in section and the ground rod has been rotated 90 degrees. Fig. 3 is an end view looking at the bottom of Fig. 2. Fig. 4 is a plan view of Fig. 3.

Referring to the drawing, 1 is a ground rod and 2 an electric conduit enclosing an electrical conductor 3. 4 is the body of the fitting proper, 5 a bolt screw-threaded into 4, 6 a nut on the bolt for clamping conductor 3 between washer 7 and the body of the fitting 4, 8 a projecting shoulder on the fitting which serves as a conduit stop, 9 a transverse opening in body 4 to permit the ground rod 1 to be installed at right angles to conduit 2, 10 a projection on body 4 for the protection of conductor 3 and 11 a projection on body 4 for retaining conductor 3 in its seat.

The ground rod 1 is ordinarily driven into the ground in a vertical position and conduit 2 may be clamped to the rod in either a vertical position, as shown in Fig. 1, or in a horizontal position as shown in Fig. 3. Body 4 is provided with an overhanging flange 8 against which the conduit abuts in order to properly position it and to prevent its going too close to the outer edge of the fitting since this would prevent the conductor 3 being kept within the body of the fitting after it leaves the end of the conduit. The bolt 5 is screw-threaded into body 5 and when tightened forces the conduit, the rod and the body into secure electrical and mechanical contact. After the bolt has been tightened the conductor 3 is wrapped around the bolt within the pocket provided by the projecting members 11 and is then securely fastened in place by means of nut 6 and washer 7.

It will be seen that conductor 3, between the point where it leaves conduit 2 and the point where it is clamped to its seat, is contained within a channeled portion of the fitting, that is, it is substantially enclosed by the metal members of the fitting on 3 sides, the fourth side being left open to facilitate connecting the conductor. This arrangement also provides proper protection for the conductor against mechanical injury and at the same time makes it possible to view the conductor and otherwise examine it sufficiently to determine its size and character.

While I have illustrated and described with particularity a single preferred form of my invention, I do not desire to be limited to the exact structural details thus illustrated and described; but intend to cover all forms and arrangements which come within the definitions of my invention constituting the appended claims.

What I claim is:

1. A ground fitting which includes a metal body having an aperture for the reception of an electrical conduit and two apertures for the reception of a ground rod, each of the rod apertures being in part common with the aperture for the conduit and being positioned at right angles to each other, a threaded aperture in the body containing a bolt the longitudinal axis being substantially at right angles to the longitudinal axis of the conduit and the center lines of the conduit and one of the rod apertures being substantially in the same plane, the center lines of the rod apertures substantially intersecting on the center line of the bolt; a pocket in the body and surrounding the bolt hole for the reception of the conductor and a nut on the bolt for clamping the conductor against the body; a projecting flange at the end of the aperture for the conduit, formed to restrict the size of the conduit opening to a size smaller than that of the conduit and a channel in the body extending from the conduit opening to the conductor pocket, the channel being at least as deep as the diameter of the conductor.

2. A fitting for connecting an electric conduit to a ground rod which includes a body member having an opening for the reception of the conduit and two openings at right angles to each other for the reception of a ground rod each of the two latter openings having a portion in common with the first opening, a threaded bolt hole in the body and a bolt in the hole positioned with its longitudinal axis at substantially right angles to the longitudinal axis of the conduit; the bolt, the conduit and the rod in either position, being so positioned that the longitudinal axis of the bolt intersects both the conduit and the rod.

3. A fitting for attaching an electrical conduit and a conductor protruding from the conduit to a ground rod; which includes a body member having an opening for the reception of the rod and an opening for the reception of the conduit, the openings having a portion in common, having a screw-thread bolt hole in the member and a bolt in the hole so positioned that its longitudinal axis intercepts a portion of both the conduit and the rod and which, when tightened, clamps the conduit and the rod directly together and into contact with the body member, and a nut on the bolt for clamping the conductor against the body member.

4. A fitting for attaching an electrical conduit and a conductor protruding from the conduit to a ground rod; which includes a body member having an opening for the reception of the rod and an opening for the reception of the conduit, the openings having a portion in common, having a screw-thread bolt hole in the member and a bolt in the hole for forcing the conduit and the rod directly together and into contact with the body member, the longitudinal axis of the bolt intercepting a portion of both the conduit and the bolt and a nut on the bolt for clamping the conductor to the body member, the body member being provided with projections adjacent to the bolt hole for retaining the conductor beneath the nut.

5. A fitting for attaching an electric conduit and a conductor protruding from the conduit to a ground rod; which includes a one piece body member having an opening for the reception of the rod and an opening for the reception of the conduit, the openings having a portion in common and a screw-threaded bolt hole and a bolt in the hole for forcing the conduit and the rod directly together and into contact with the body member, the longitudinal axis of the bolt intersecting a portion of both the conduit and the rod and means for fastening the conductor to the body member, the body member being formed with a channel shaped opening connecting the conduit opening with that portion of the body against which the conductor is clamped, the depth of the channel being not less than the diameter of the conductor.

STEPHEN W. BORDEN.